(12) United States Patent
Johanneck et al.

(10) Patent No.: US 10,456,608 B2
(45) Date of Patent: Oct. 29, 2019

(54) SAFETY APPARATUS FOR ARRESTING A FALL OF A WORKER

(71) Applicant: Garlock Safety Systems Inc., Minneapolis, MN (US)

(72) Inventors: Stephen C. Johanneck, Robbinsdale, MN (US); Richard B. Stoffels, Eden Prairie, MN (US); Robert James Olson, Medina, MN (US)

(73) Assignee: Garlock Safety Systems Inc., Alexandria, MN (US)

( * ) Notice: Subject to any disclaimer, the term of this patent is extended or adjusted under 35 U.S.C. 154(b) by 173 days.

(21) Appl. No.: 15/426,091

(22) Filed: Feb. 7, 2017

(65) Prior Publication Data

US 2017/0225017 A1  Aug. 10, 2017

Related U.S. Application Data

(60) Provisional application No. 62/292,378, filed on Feb. 8, 2016.

(51) Int. Cl.
 *A62B 35/00* (2006.01)
 *B62B 5/04* (2006.01)

(52) U.S. Cl.
 CPC .......... *A62B 35/0068* (2013.01); *B62B 5/049* (2013.01)

(58) Field of Classification Search
 CPC ............... H01L 21/67772; A62B 35/04; A62B 35/0068; B62B 5/049
 See application file for complete search history.

(56) References Cited

U.S. PATENT DOCUMENTS

| | | | | | |
|---|---|---|---|---|---|
| 1,349,209 | A | * | 8/1920 | Kirchner | B65D 90/623 105/310.1 |
| 1,676,197 | A | * | 7/1928 | Marrinan | E02D 5/80 411/457 |
| 1,870,163 | A | * | 8/1932 | Behling | B62B 1/18 280/47.24 |
| 1,982,963 | A | * | 12/1934 | Post | E02D 5/803 411/347 |
| 2,262,310 | A | * | 11/1941 | Wooldridge | E02F 3/6472 267/255 |
| 2,506,048 | A | * | 5/1950 | Van Den Akker | G01N 3/062 73/852 |

(Continued)

*Primary Examiner* — Katherine W Mitchell
*Assistant Examiner* — Candace L Bradford
(74) *Attorney, Agent, or Firm* — Alan D. Kamrath; Mayer & Williams PC

(57) ABSTRACT

A safety apparatus (10) includes a weight pan (18) removably receiving a plurality of weights (W) pivotably mounted about a pan axis (A) between frame sides (12). Wheels are rotatably mounted to the first ends of the frame sides (12). An I-shaped main frame (40) is pivotably mounted to the frame about a first frame axis (J) generally perpendicular to the pan axis (A) and also a second frame axis (E) generally parallel to the pan axis (A). By pivoting the main frame (40) about the first frame axis (J), a steering function is provided to the frame. By pivoting the main frame (40) about the second frame axis (E), the frame is pivoted between an actuated position with the weight pan (18) resting upon a surface and a transport position with the weight pan (18) spaced from the surface and with the frame moveable on the surface (102).

20 Claims, 3 Drawing Sheets

(56) References Cited

U.S. PATENT DOCUMENTS

| | | | | |
|---|---|---|---|---|
| 2,837,915 A * | 6/1958 | Brown, Jr. | G01N 3/14 | 73/831 |
| 3,543,872 A * | 12/1970 | Halls | B62D 49/0657 | 180/208 |
| 3,577,715 A * | 5/1971 | Halls | A01D 43/10 | 56/208 |
| 3,759,346 A * | 9/1973 | Brda | A62B 1/14 | 182/7 |
| 3,810,593 A * | 5/1974 | Krysl | A63G 25/00 | 242/403 |
| 3,854,153 A * | 12/1974 | Fadler | A47C 17/23 | 5/13 |
| 4,144,843 A * | 3/1979 | Schrougham | A01K 1/04 | 119/786 |
| 4,213,624 A * | 7/1980 | Sanders | B62B 3/0606 | 280/43.12 |
| 4,223,906 A * | 9/1980 | Gratza | B62H 1/02 | 180/219 |
| 4,315,387 A * | 2/1982 | Lee | E02D 5/80 | 52/156 |
| 4,440,261 A * | 4/1984 | Clark | A62B 1/06 | 182/142 |
| 4,512,438 A * | 4/1985 | Vilchek | A62B 1/12 | 182/238 |
| 4,703,831 A * | 11/1987 | Forrest | A62B 1/06 | 182/3 |
| 4,838,439 A * | 6/1989 | Baziuk | A62B 5/00 | 182/3 |
| 4,925,226 A * | 5/1990 | Leonard, Jr. | B66C 1/663 | 294/102.1 |
| 5,069,293 A * | 12/1991 | St. Romain | A01B 45/02 | 171/144 |
| 5,423,386 A * | 6/1995 | Lapearous | A01B 45/02 | 172/22 |
| 5,433,044 A * | 7/1995 | Walcher | A62B 35/0068 | 52/111 |
| 5,950,373 A * | 9/1999 | von Hoff | E02D 27/01 | 206/321 |
| 5,979,601 A * | 11/1999 | Lu | A62B 1/10 | 182/231 |
| 5,992,864 A * | 11/1999 | Dickson | B62K 3/002 | 280/87.041 |
| 6,007,031 A * | 12/1999 | Tang | B62B 1/045 | 248/96 |
| 6,019,330 A * | 2/2000 | Affrunti | E04D 15/00 | 182/45 |
| 6,041,730 A * | 3/2000 | Oliverio | B63B 21/26 | 114/230.13 |
| 6,227,553 B1 * | 5/2001 | Palmer | A62B 35/0068 | 280/47.18 |
| 6,401,863 B1 * | 6/2002 | Kirkland | B66D 3/20 | 182/142 |
| 6,412,230 B1 * | 7/2002 | Zambelli | E04G 21/3261 | 52/27 |
| 6,491,606 B1 * | 12/2002 | Swift | A63B 22/0605 | 482/57 |
| 7,032,710 B2 * | 4/2006 | Anderson | A62B 35/0068 | 182/16 |
| 8,550,023 B1 * | 10/2013 | Quail | B63B 21/26 | 114/230.13 |
| 8,584,798 B2 * | 11/2013 | Stoffels | A62B 99/00 | 182/3 |
| 2006/0107605 A1 * | 5/2006 | Krahn | E02D 5/80 | 52/155 |
| 2007/0122263 A1 * | 5/2007 | Pfeiffer | B65B 69/0083 | 414/810 |
| 2007/0289811 A1 * | 12/2007 | Smith | A62B 35/04 | 182/3 |
| 2008/0300115 A1 * | 12/2008 | Erlandson | A63B 22/0235 | 482/54 |
| 2009/0321184 A1 * | 12/2009 | Hamilton | A62B 99/00 | 182/3 |
| 2010/0283222 A1 * | 11/2010 | Lin | B62H 1/04 | 280/303 |
| 2010/0300017 A1 * | 12/2010 | Bulloch | B63B 21/40 | 52/157 |
| 2012/0222909 A1 * | 9/2012 | Llopiz-Capote | A01D 34/003 | 180/291 |

\* cited by examiner

SAFETY APPARATUS FOR ARRESTING A FALL OF A WORKER

BACKGROUND

A safety apparatus for arresting a fall of a worker is shown and described.

U.S. Pat. No. 8,584,798 disclosed a safety apparatus to which a force of a worker falling from a surface 102 is transmitted via a harness and cable 82. Generally, a slide having teeth is slid in the safety apparatus to dig into and thus grip surface 102, preventing further falling of the worker. Thus, movement of elements is required in the safety apparatus in the event that the worker should fall from surface 102, and surface 102 may be damaged in the event that the teeth dig into surface 102. Thus, a need exists for a safety apparatus which is easily transported to the required location on surface 102, but movement of elements does not occur in an actuated mode and damage to surface 102 is avoided if actuation occurs.

SUMMARY

This need and other problems in the field of fall protection is solved by providing a safety apparatus for arresting a fall of a worker. Specifically, mobility elements are provided on first ends of spaced frame sides of a frame. A front assembly connected to the second ends of the spaced frame elements is movable between an actuated position and a transport position. A weight pan is connected between the spaced frame sides and between the first and second ends. A safety cable connected to a worker can be connected to the safety apparatus for arresting a fall from a surface. In the transport position, the weight pan is spaced from the surface and movable on the surface by the mobility elements. In the actuated position, the weight pan is supported on the surface for frictional engagement therewith.

In an aspect shown, the front assembly is pivotably connected to the frame about a first frame axis in the plane perpendicular to the surface to provide steering of the front assembly in the transport position. In a further aspect shown, the front assembly includes an interconnection portion located above the weight pan and intermediate the spaced frame sides in the actuated position and extending away from the weight pan and the frame in the transport position.

Similarly, in an aspect shown, the front assembly is pivotably connected to the frame about a frame axis in a plane parallel to the surface, with the front assembly being pivotal between the transport and actuating positions about the frame axis. In a further aspect shown, the front assembly is removably held in one of a plurality of positions between the actuated position and the transport position such as by a pawl pivotably mounted to the frame and engaging with one of a plurality of teeth of an ear connected to the front assembly. In still further aspects shown, the front assembly includes an interconnection portion located above the weight pan and intermediate the frame sides in the actuated position and extending away from the weight pan and the frame in the transport position.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
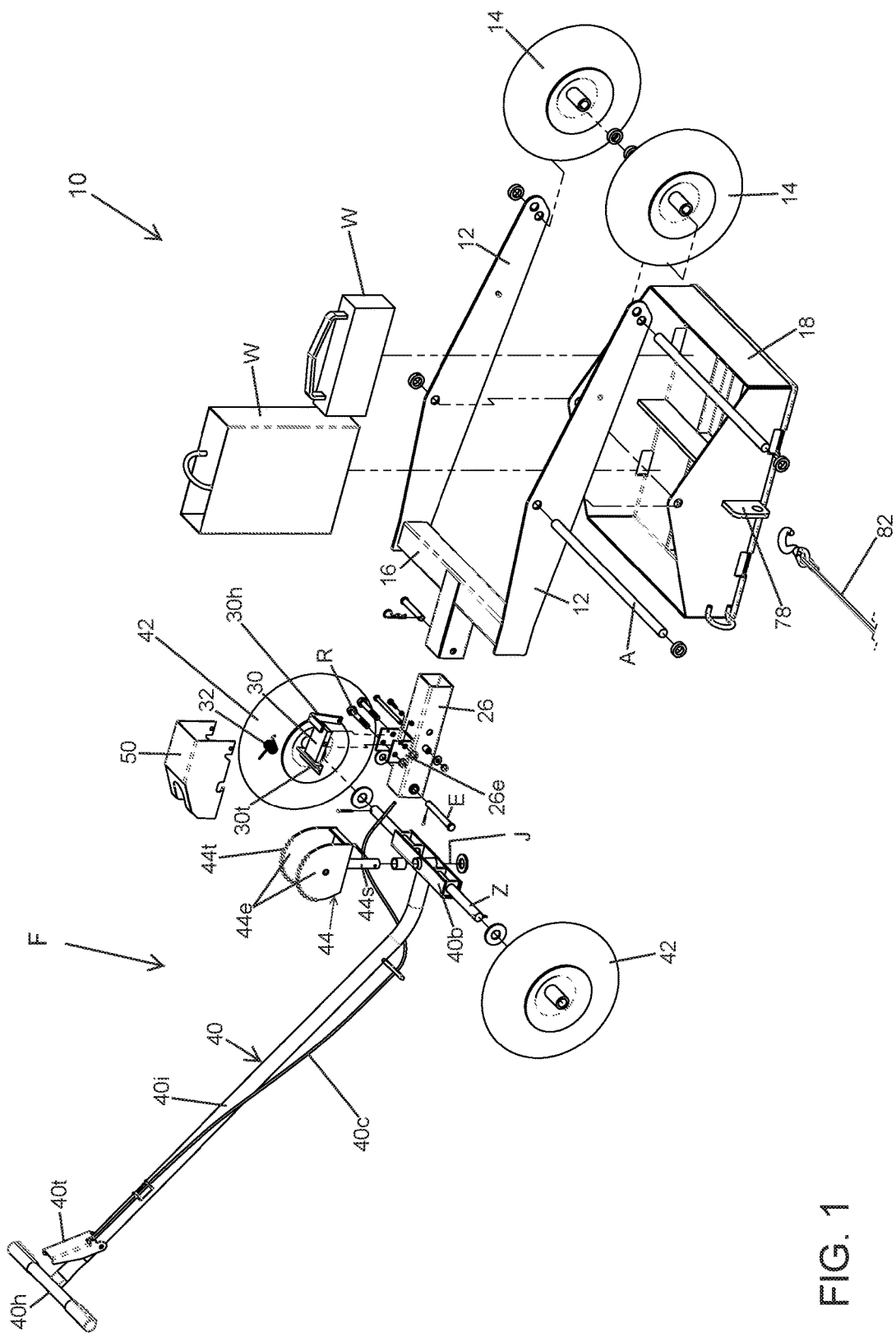
FIG. 1 shows an exploded perspective view of a safety apparatus for arresting a fall of a worker.
Figure 2:
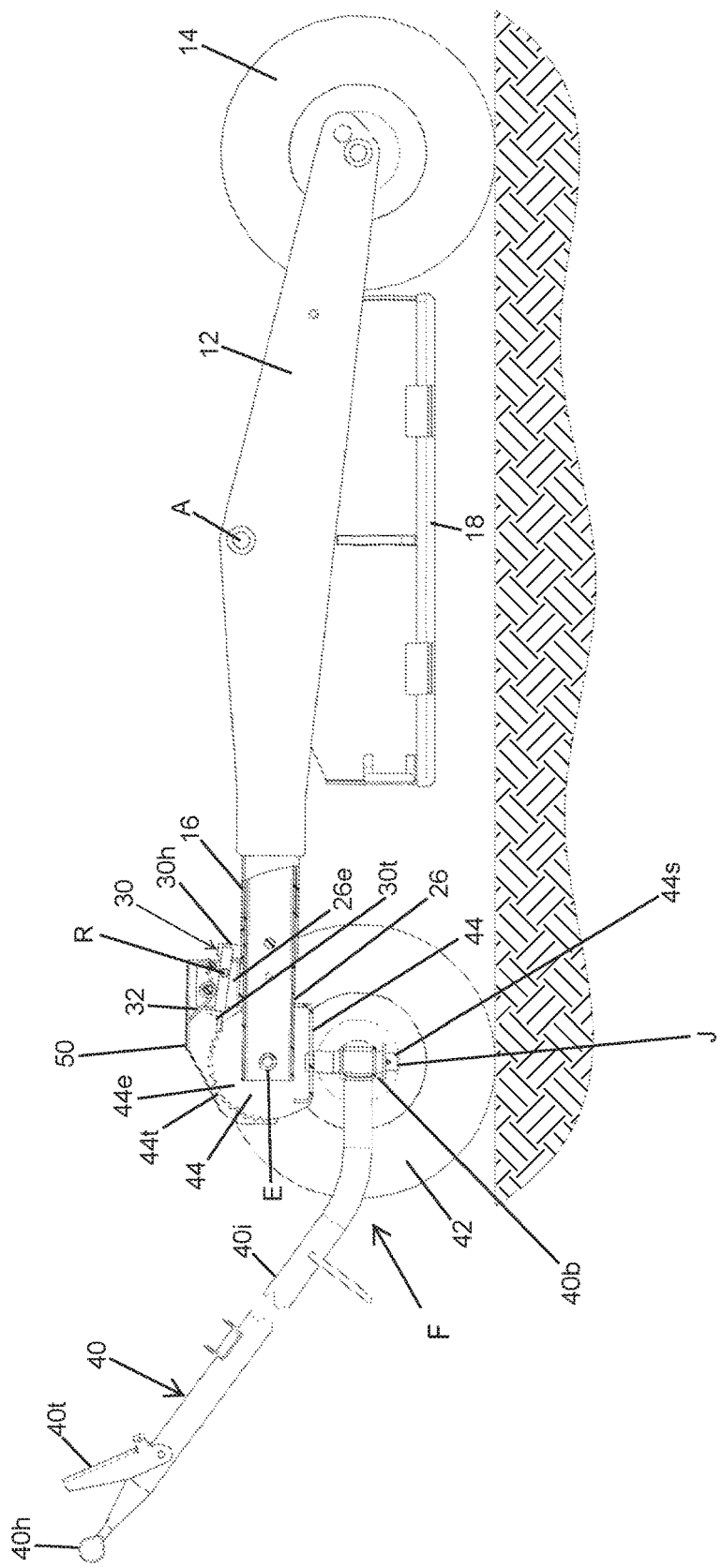
FIG. 2 shows a side view in partial cross section of the safety apparatus of FIG. 1 in a transport mode.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

An illustrative embodiment of a safety apparatus for arresting a fall of a worker is shown in the drawings and generally designated 10. According to the form shown, safety apparatus 10 is placed on an elevated surface 102. Surface 102 can be a flat roof surface, an upper story of a multi-story building being constructed, or the like. Safety apparatus 10 protects and allows free movement of a worker on surface 102.

Generally, apparatus 10 includes a frame including first and second frame sides 12. The first ends of frame sides 12 include suitable elements or provisions 14 to provide mobility upon surface 102, such as wheels as shown rotatably mounted thereto by any suitable construction. The second ends of frame sides 12 are connected to the opposite ends of a head of a T-shaped connector 16. Frame sides 12 are shown as being in a spaced, parallel relation.

A weight pan 18 is connected to and shown as being pivotably attached to and between frame sides 12 and between connector 16 and provisions 14. Weight pan 18 pivots about an axis A parallel to, but spaced from, the axis of the wheels forming provisions 14 and surface 102. Apparatus 10 includes a ring 78 at least on one side generally vertically below axis A and configured so that cable 82 can be connected thereto. In this regard, ring 78 is operatively connected to weight pan 18, such as, but not limited to, being connected directly thereto. The lower surface of weight pan 18 can be suitably coated with high friction material, such as a thermoplastic including, but not limited to, polyvinylchloride, to increase friction with surface 102. A plurality of weights W, partially shown, is removably received in weight pan 18.

The frame further includes a frame extension 26 slideably received upon a leg of connector 16. A pawl 30 is pivotably mounted to frame extension 26 about an axis R spaced from and parallel to axis A. Pawl 30 generally includes an engagement tooth 30t and a handle 30h located on opposite sides of axis R. In the form shown, pawl 30 is pivotably mounted to first and second, spaced, parallel, tabs or pivot ears 26e upstanding from extension 26. A biasing element 32, such as a torsion spring, is further carried by pivot ears 26e and abuts with pawl 30.

Apparatus 10 generally includes a front assembly F including an I-shaped main frame 40 having an interconnection portion 40i extending generally perpendicularly between a handle 40h and a base 40b. In the form illustrated, interconnection portion 40i includes an obtuse angle spaced from and between handle 40h and base 40b. Base 40b defines an axis Z for elements or provisions 42 for providing mobility, such as wheels as shown. A joint 44 includes a shaft 44s rotatably mounted to base 40b about an axis J generally perpendicular to axis Z and in a plane perpendicular to surface 102 and in the plane of interconnection portion 40i. Joint 44 further includes spaced ears 44e of a generally semicircular shape extending parallel to and on opposite sides of shaft 44s. Each ear 44e includes a plurality of teeth 44t.

Frame extension 26 is moveably connected to the second ends of frame sides 12 shown as being pivotably mounted to and between ears 44e about an axis E in a plane parallel to surface 102 spaced from and parallel to axes A and R, with tooth 30t of pawl 30 being biased to engage with the plurality of teeth 44t. A cover 50 is removably attached to frame extension 26 and encloses ears 44e and pawl 30, with biasing element 32 also abutting with cover 50.

Figure 3:
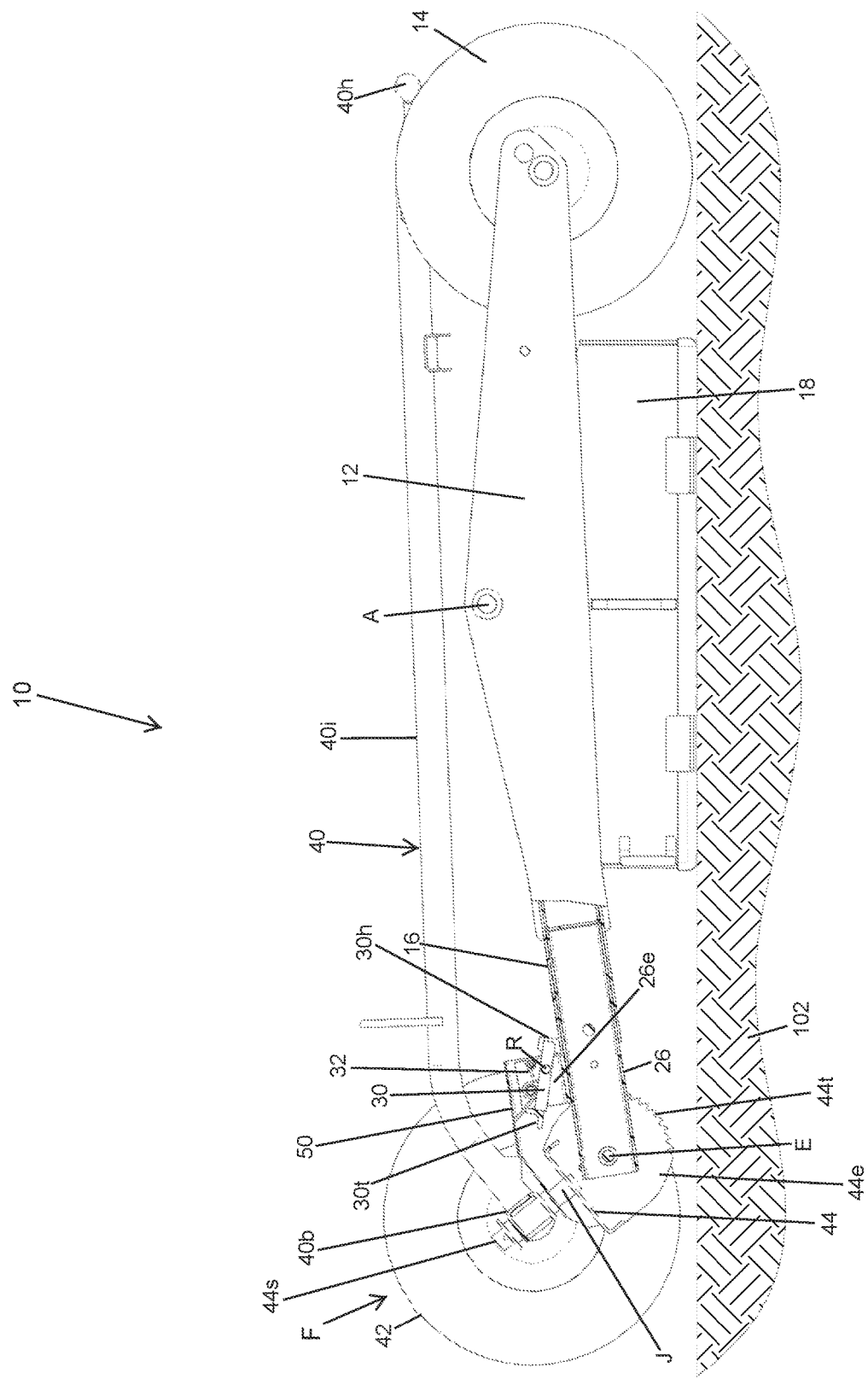
FIG. 3 shows a side view in partial cross section of the safety apparatus of FIG. 1 in an actuation mode.

Apparatus 10 and front assembly F thereof are positionable between an actuated position and a transport position. In the actuated position, weight pan 18 is positioned on and rests upon surface 102, with pawl 30 in the form shown engaging with ears 44e but spaced from the plurality of teeth 44t. As shown in FIG. 3, the second ends of frames sides 12 are between axis Z and surface 102 in the actuated position. Furthermore, interconnection portion 40i extends over the frame with handle 40h abutting with provisions 14 so that interconnection portion 40i is located above weight pan 18 and intermediate first and second frame sides 12. In the actuated position, cable 82 can be connected to a harness of a worker that has a potential to fall from surface 102 and to ring 78. In the event that the worker should fall, the fall will be arrested by cable 82 transferring force to apparatus 10 which acts as an anchor due to the frictional engagement of weight pan 18 with surface 102. Since interconnection portion 40i extends over the frame, main frame 40 is protected from unintentional engagement during use or storage, and apparatus 10 is compact in the actuated position.

To position apparatus 10 from the actuated position to the transport position, main frame 40 is grasped and pivoted about axis Z, with pawl 30 biased to abut against ears 44e and engage the plurality of teeth 44t by biasing element 32. It should be appreciated that with pivoting of main frame 40, frame extension 26 pivots relative to joint 44, such that the spacing of axis E from surface 102 increases sufficiently to space and position weight pan 18 above surface 102, with axis Z being between the second ends of frame sides 12 and surface 102. Weight pan 18 in the transport position is above weight pan 18 in the actuated position. In the transport position, interconnection portion 40i extends away from weight pan 18 and the frame. Main frame 40 can be pivoted about axis E until pawl 30 engages with one of the plurality of teeth 44t to removably hold front assembly F in one of a plurality of positions defined by the plurality of teeth 44t between the actuated position and the transport position, with the spacing of handle 40h from surface 102 comfortable for the person transporting apparatus 10 to grasp. It should be appreciated that front assembly F provides a steering function by moving handle 40h and interconnection portion 40i of main frame 40 in a plane parallel to surface 102 from side to side to pivot front assembly F about axis J. Thus, apparatus 10 can be easily moved on surface 102 in the transport position.

To position apparatus 10 from the transport position to the actuated position, handle 30h can be moved against the bias of the biasing element 32 to remove engagement tooth 30t from the plurality of teeth 44t, with main frame 40 slowly being pivoted about axis Z toward the frame and weight pan 18 and the actuated position. In the form shown, a trigger 40t adjacent to handle 40h can be pivoted to pull an engagement cable 40c attached to handle 30h to move pawl 30 against the bias of biasing element 32.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Safety apparatus for placement on a surface comprising, in combination: a frame including first and second frame sides each having first and second ends, with the first ends of the first and second frame sides including first mobility elements providing mobility on the surface; a front assembly including second mobility elements providing mobility on the surface, with the front assembly moveably connected to the second ends of the first and second frame sides, with the front assembly moveable between an actuated position and a transport position, with the second ends of the first and second frame sides in the transport portion being above the second ends of the first and second frame sides in the actuated position; a weight pan connected between the first and second frame sides and between the first and second ends of the first and second frame sides, with the weight pan positioned on the surface in the actuated position and positioned above the surface in the transport position; and a safety cable connection operably connected to the weight pan configured to connect to a safety cable connected to a worker.

2. The safety apparatus as claimed in claim 1, wherein the front assembly comprises an interconnection portion, with the interconnection portion located above the weight pan and intermediate the first and second frame sides in the actuated position and extending away from the weight pan and the frame in the transport position.

3. The safety apparatus as claimed in claim 2, wherein the front assembly is pivotably connected to the second ends of the first and second frame sides about a first frame axis in a plane perpendicular to the surface, with the interconnection portion moveable in a direction in a plane parallel to the surface to pivot the front assembly about the first frame axis providing steering of the front assembly.

4. The safety apparatus as claimed in claim 3, wherein the front assembly is pivotably connected to the second ends of the first and second frame sides about a second frame axis in the parallel plane, with the front assembly being pivotal between the actuated and transport positions.

5. The safety apparatus as claimed in claim 4, wherein the front assembly is removably held in one of a plurality of assembly positions between the actuated position and the transport position.

6. The safety apparatus as claimed in claim 5, further comprising, in combination: an ear having a plurality of teeth arranged in a semicircular shape about the second frame axis and connected to the front assembly; and a pawl pivotably mounted to the frame about a pawl axis spaced from and parallel to the second frame axis, with the pawl engageable with one of the plurality of teeth to removably hold the front assembly in the one of the plurality of assembly positions.

7. The safety apparatus as claimed in claim 4, wherein the second mobility elements comprise first and second wheels rotatable about a first wheel axis, with the first wheel axis being between the second ends of the first and second frame sides and the surface in the transport position and with the second ends of the first and second frame sides being between the first wheel axis and the surface in the actuated position.

8. The safety apparatus as claimed in claim 7, wherein the front assembly is removably held in one of a plurality of assembly positions between the actuated position and the transport position.

9. The safety apparatus as claimed in claim 8, further comprising, in combination: an ear having a plurality of teeth arranged in a semicircular shape about the second frame axis and connected to the front assembly; and a pawl pivotably mounted to the frame about a pawl axis spaced from and parallel to the second frame axis, with the pawl engageable with one of the plurality of teeth to removably hold the front assembly in the one of the plurality of assembly positions.

10. The safety apparatus as claimed in claim 8, further comprising, in combination: a biasing element biasing the pawl to engage with the ear; a pawl handle on the pawl and on an opposite side of the pawl axis than the ear; a trigger pivotably connected to the interconnection portion; and an engagement cable attached to the pawl handle and the trigger to move the pawl against the bias of the biasing element.

11. The safety apparatus as claimed in claim 10, wherein the second ends of the first and second frame sides are spaced from each other, and wherein the weight pan is pivotably connected to the frame between the first and second frame sides about a pan axis spaced from and parallel to the second frame axis.

12. The safety apparatus as claimed in claim 11, wherein the first mobility elements comprise third and fourth wheels rotatable about a second wheel axis parallel to and spaced from the pan axis and the second axis, with the pan axis located intermediate the second frame axis and the second wheel axis.

13. The safety apparatus as claimed in claim 12, further comprising, in combination: a joint comprising a shaft defining the front frame axis, with the joint including the ear and another ear parallel to and on opposite sides of the shaft, with the frame including a frame extension located intermediate the ear and the other ear, with the second frame axis extending through the ear, the other ear and the frame extension, with the frame extension including first and second, spaced, parallel tabs, with the pawl pivotably mounted to and between the first and second tabs, with the frame including a T-shaped connection, with the second ends of the first and second frame sides connected to opposite ends of a head of the T-shaped connection, and with the frame extension slideably connected upon a leg of the T-shaped connection; and a cover removably connected to the frame extension and enclosing the pawl and the first and second tabs.

14. The safety apparatus as claimed in claim 13, wherein the front assembly includes an I-shaped main frame having the interconnection portion extending generally perpendicular between a frame handle and a base, with the base defining the first wheel axis, with the interconnection portion including an obtuse angle spaced from and between the frame handle and the base.

15. The safety apparatus as claimed in claim 1, wherein the front assembly is pivotably connected to the second ends about a frame axis in a plane parallel to the surface, with the front assembly being pivotal between the actuated and transport positions.

16. The safety apparatus as claimed in claim 15, wherein the second mobility elements comprise first and second wheels rotatable about a first wheel axis, with the first wheel axis being between the second ends of the first and second frame sides and the surface in the transport position and with the second ends of the first and second frame sides being between the first wheel axis and the surface in the actuated position.

17. The safety apparatus as claimed in claim 15, further comprising, in combination: an ear having a plurality of teeth arranged in a semicircular shape about the frame axis and connected to the front assembly; and a pawl pivotably mounted to the frame about a pawl axis spaced from and parallel to the frame axis, with the pawl engageable with one of the plurality of teeth to removably hold the front assembly in one of the actuated and transport positions.

18. The safety apparatus as claimed in claim 1, wherein the front assembly is pivotably connected to the second ends of the first and second frame sides about a first frame axis in a plane perpendicular to the surface, with the front assembly being pivotable about the first frame axis providing steering of the front assembly.

19. The safety apparatus as claimed in claim 18, further comprising, in combination: a joint comprising a shaft defining the first frame axis, with the joint including spaced ears; and a frame extension pivotably mounted to and between the spaced ears about a second frame axis, with the frame extension connected to the frame.

20. The safety apparatus as claimed in claim 19, wherein the front assembly is removably held in one of a plurality of assembly positions between the actuated position and the transport position.

* * * * *